(12) United States Patent
Hu et al.

(10) Patent No.: US 10,742,300 B2
(45) Date of Patent: Aug. 11, 2020

(54) COMMUNICATION METHOD, NETWORK DEVICE, AND TERMINAL DEVICE

(71) Applicant: Huawei Technologies Co., Ltd., Shenzhen (CN)

(72) Inventors: Xingxing Hu, Shanghai (CN); Tianle Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/460,010

(22) Filed: Jul. 2, 2019

(65) Prior Publication Data

US 2019/0326976 A1    Oct. 24, 2019

Related U.S. Application Data

(63) Continuation of application No. PCT/CN2017/118742, filed on Dec. 26, 2017.

(30) Foreign Application Priority Data

Jan. 5, 2017  (CN) .......................... 2017 1 0008565

(51) Int. Cl.
*H04J 1/00*    (2006.01)
*H04B 7/06*   (2006.01)
(Continued)

(52) U.S. Cl.
CPC ......... *H04B 7/0695* (2013.01); *H04L 5/0023* (2013.01); *H04W 36/06* (2013.01);
(Continued)

(58) Field of Classification Search
USPC ........................................................ 375/262
See application file for complete search history.

(56) References Cited

U.S. PATENT DOCUMENTS 10,305,561 B2 *  5/2019  Baek .................... H04W 16/28
10,306,503 B2 *  5/2019  Jung .................... H04B 7/0617
(Continued)

FOREIGN PATENT DOCUMENTS

CN    104521155 A    4/2015
CN    104956604 A    9/2015
(Continued)

OTHER PUBLICATIONS

Samsung, "Overview on beam management," 3GPP TSG RAN WG1 #86-bis, R1-1609080, Lisbon, Portugal, Oct. 10-14, 2016, 5 pages.

*Primary Examiner* — Eva Y Puente
(74) *Attorney, Agent, or Firm* — Slater Matsil, LLP

(57) ABSTRACT

A communication method, a network device, and a terminal device the method including sending, by a network device, instruction information to a terminal device in a first time period by using a first serving beam, where the instruction information is used to instruct the terminal device to communicate with the network device in a second time period by using a second serving beam, and communicating, by the network device, with the terminal device in the second time period by using the second serving beam according to the instruction information, where the first time period is earlier than the second time period.

14 Claims, 7 Drawing Sheets

(51) Int. Cl.
  *H04L 5/00* (2006.01)
  *H04W 36/06* (2009.01)
  *H04W 72/04* (2009.01)
(52) U.S. Cl.
  CPC ..... *H04W 72/046* (2013.01); *H04W 72/0493* (2013.01); *H04J 1/00* (2013.01)

(56) References Cited

U.S. PATENT DOCUMENTS

| | | | |
|---|---|---|---|
| 10,333,602 B2 * | 6/2019 | Yoo | ............... H04B 7/0695 |
| 2014/0120926 A1 | 5/2014 | Shin et al. | |
| 2016/0006122 A1 | 1/2016 | Seol et al. | |
| 2016/0309305 A1 | 10/2016 | Wilhelmsson et al. | |
| 2017/0099673 A1 | 4/2017 | Byun et al. | |
| 2017/0325057 A1 | 11/2017 | Zhang et al. | |
| 2017/0332407 A1 * | 11/2017 | Islam | ............... H04W 52/242 |
| 2018/0123675 A1 | 5/2018 | Shi et al. | |
| 2018/0152869 A1 | 5/2018 | Cedergren et al. | |
| 2018/0159600 A1 * | 6/2018 | Kim | ............... H04B 7/0617 |
| 2018/0183505 A1 | 6/2018 | Kim et al. | |
| 2019/0058517 A1 * | 2/2019 | Kang | ............... H04B 7/0456 |
| 2019/0173740 A1 * | 6/2019 | Zhang | ............... H04L 41/0668 |
| 2019/0253127 A1 * | 8/2019 | Kang | ............... H04W 72/085 |

FOREIGN PATENT DOCUMENTS

| | | |
|---|---|---|
| CN | 105556869 A | 5/2016 |
| CN | 107925937 A | 4/2018 |
| EP | 3122136 A1 | 1/2017 |
| KR | 20160056239 A | 5/2016 |
| WO | 2015141901 A1 | 9/2015 |
| WO | 2016115711 A1 | 7/2016 |
| WO | 2016146010 A1 | 9/2016 |
| WO | 2016173669 A1 | 11/2016 |
| WO | 2016179804 A1 | 11/2016 |
| WO | 2016204365 A1 | 12/2016 |

* cited by examiner

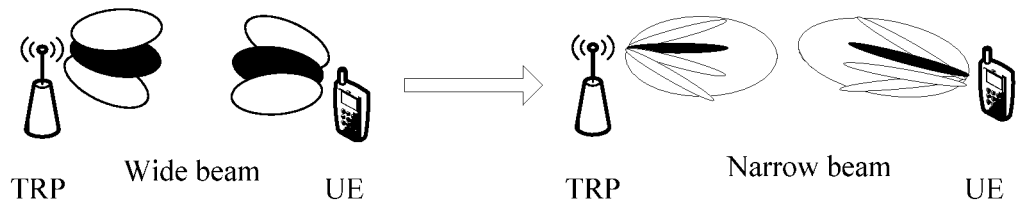

| A network device sends instruction information to a terminal device in a first time segment by using a first serving beam, where the instruction information is used to instruct the terminal device to communicate with the network device in a second time segment by using a second serving beam | 410 |

| The network device communicates with the terminal device in the second time segment by using the second serving beam according to the instruction information, where the first time segment is earlier than the second time segment | 420 |

FIG. 4

Send a control channel PDCCH of the UE 1 in the beam 4,
to instruct the UE 1 to receive/send a signal in the beam 1
Send a control channel PDCCH of the UE 2 in the beam 4,
to instruct the UE 2 to receive/send a signal in the beam 2

COMMUNICATION METHOD, NETWORK DEVICE, AND TERMINAL DEVICE

CROSS-REFERENCE TO RELATED APPLICATIONS

This application is a continuation of International Application No. PCT/CN2017/118742, filed on Dec. 26, 2017, which claims priority to Chinese Patent Application No. 201710008565.8, filed on Jan. 5, 2017. The disclosures of the aforementioned applications are hereby incorporated by reference in their entireties.

TECHNICAL FIELD

Embodiments of this application relate to the communications field, and more specifically, to a communication method, a network device, and a terminal device.

BACKGROUND

With development of communications technologies, an increasing quantity of terminal devices need to access a radio network system. This imposes a higher throughput requirement on a network system. To meet this requirement, a simplest method is to increase radio network bandwidth. Although low-band radio bandwidth resources are limited, high-band radio bandwidth resources are abundant. Therefore, transmitting a service on a high-band radio resource is considered. However, a high-band radio propagation is limited by rapid signal attenuation. As a result, a high-band radio coverage area is relatively small.

In a current research, a plurality of antennas are used to form a beam that has a high antenna gain, so as to enlarge a high-band coverage area. However, due to a limitation on antenna costs on a base station side, each transmission point (TP) of a base station (NodeB) can cover only one direction or several directions at a specific moment, as shown in FIG. 1. Likewise, a terminal device also uses a beam to receive a signal, so as to increase a reception gain, and only one or several beams can be formed at a specific moment.

During beam scheduling, a network device usually determines a to-be-scheduled beam by considering resource utilization and a delay of each terminal device. However, when only a few terminal devices in a coverage area of a beam need to transmit data packets, when the network device schedules the beam, the terminal devices cannot fully use corresponding radio resources. This causes a waste of resources.

Therefore, a technical means is urgently needed to improve resource utilization of a beam.

SUMMARY

Embodiments of this application provide a communication method, a network device, and a terminal device, so as to effectively improve resource utilization of a beam.

According to a first aspect, a communication method is provided, including sending, by a network device, instruction information to a terminal device in a first time period by using a first serving beam, where the instruction information is used to instruct the terminal device to communicate with the network device in a second time period by using a second serving beam, and communicating, by the network device, with the terminal device in the second time period by using the second serving beam according to the instruction information, where the first time period is earlier than the second time period.

Therefore, according to the method provided in this embodiment of this application, a serving beam used for communication between the network device and the terminal device can be dynamically adjusted in different time periods depending on a network status, improving resource utilization.

Further, the network device may notify, in the first time period, the terminal device of a serving beam to be used in the second time period, so that the terminal device does not need to determine the serving beam in the second time period by obtaining beam information, but can directly transmit a signal in the corresponding serving beam.

With reference to the first aspect, in a first possible implementation of the first aspect, the network device sends a control channel in the first time period by using the first serving beam, where the control channel is used to carry the instruction information, and the network device transmits a data channel with the terminal device in the second time period by using the second serving beam, where the data channel is used to carry data information or control information used for communicating with the terminal device.

Therefore, the network device may send the control channel in the first serving beam, add the instruction information to the control channel, and instruct, by using the instruction information, the terminal device to transmit the data channel with the network device in the second serving beam.

With reference to the first aspect and the foregoing implementation of the first aspect, in a second possible implementation of the first aspect, the method further includes sending, by the network device, a first reporting request to the terminal device, where the first reporting request includes identification information of each beam in a first beam set, and the first reporting request is used to request the terminal device to report signal quality of each beam in the first beam set, and receiving, by the network device, a measurement report sent by the terminal device, where the measurement report sent by the terminal device includes the signal quality of each beam in the first beam set, and the first serving beam and the second serving beam belong to the first beam set.

Therefore, in this embodiment of this application, the reporting request is sent to the terminal device, to request the terminal device to report the signal quality of each beam in the specified first beam set, so that the network device determines a serving beam from the first beam set. This can help improve resource utilization of a serving beam.

With reference to the first aspect and the foregoing implementation of the first aspect, in a third possible implementation of the first aspect, the method further includes sending, by the network device, a second reporting request to the terminal device, where the second reporting request includes a signal threshold condition, and the second reporting request is used to request the terminal device to report identification information of beams that satisfy the signal threshold condition, and receiving, by the network device, a measurement report sent by the terminal device, where the measurement report sent by the terminal device includes the identification information of the beams that satisfy the signal threshold condition, the beams that satisfy the signal threshold condition constitute a second beam set, and the first serving beam and the second serving beam belong to the second beam set.

Therefore, in this embodiment of this application, the reporting request is sent to the terminal device, to request the terminal device to report the identification information of the beams that satisfy the signal threshold condition and that constitute the second beam set, so that the network device determines a serving beam from the second beam set. This can help improve resource utilization of a serving beam.

With reference to the first aspect and the foregoing implementation of the first aspect, in a fourth possible implementation of the first aspect, the sending a first reporting request to the terminal device includes sending the first reporting request to the terminal device by using a physical layer control channel or a MAC control element.

According to a second aspect, a communication method is provided, including receiving, by a terminal device in a first time period by using a first serving beam, instruction information sent by a network device, where the instruction information is used to instruct the terminal device to communicate with the network device in a second time period by using a second serving beam, and communicating, by the terminal device, with the network device in the second time period by using the second serving beam according to the instruction information, where the first time period is earlier than the second time period.

Therefore, according to the method provided in this embodiment of this application, a serving beam used for communication between the network device and the terminal device can be dynamically adjusted in different time periods depending on a network status, improving resource utilization.

With reference to the second aspect, in a first possible implementation of the second aspect, the terminal device receives, in the first time period by using the first serving beam, a control channel sent by the network device, where the control channel is used to carry the instruction information, and the terminal device transmits a data channel with the network device in the second time period by using the second serving beam, where the data channel is used to carry data information or control information used for communicating with the network device.

With reference to the second aspect and the foregoing implementation of the second aspect, in a second possible implementation of the second aspect, the method further includes receiving, by the terminal device, a first reporting request sent by the network device, where the first reporting request includes identification information of each beam in a first beam set, and the first reporting request is used to request the terminal device to report signal quality of each beam in the first beam set, and sending, by the terminal device, a measurement report to the network device, where the measurement report sent by the terminal device includes the signal quality of each beam in the first beam set, and the first serving beam and the second serving beam belong to the first beam set.

With reference to the second aspect and the foregoing implementation of the second aspect, in a third possible implementation of the second aspect, the method further includes receiving, by the terminal device, a second reporting request sent by the network device, where the second reporting request includes a signal threshold condition, and the second reporting request is used to request the terminal device to report identification information of beams that satisfy the signal threshold condition, and sending, by the terminal device, a measurement report to the network device, where the measurement report sent by the terminal device includes the identification information of the beams that satisfy the signal threshold condition, the beams that satisfy the signal threshold condition constitute a second beam set, and the first serving beam and the second serving beam belong to the second beam set.

According to a third aspect, a communication method is provided, including receiving, by a terminal device, a service policy sent by a network device, determining, by the terminal device, a serving beam from a candidate serving beam set according to the service policy, and communicating, by the terminal device, with the network device by using the serving beam.

Therefore, according to the method provided in this embodiment of this application, the terminal device receives the service policy sent by the network device, and the terminal device selects the serving beam according to the service policy, so that the terminal device can flexibly select a serving beam depending an actual signal transmission status, and resource utilization can be improved.

With reference to the third aspect, in a first possible implementation of the third aspect, the service policy includes using a first beam to communicate with the network device when the terminal device transmits one of the following channels with the network device a physical downlink control channel (PDCCH), a physical uplink control channel (PUCCH), and a physical hybrid automatic repeat request indicator channel (PHICH), or using a second beam to communicate with the network device when the terminal device transmits one of the following channels with the network device a physical downlink shared channel (PDSCH) and a physical uplink shared channel (PUSCH), where the first beam and the second beam are beams in the candidate serving beam set, and the first beam is different from the second beam.

With reference to the third aspect and the foregoing implementation of the third aspect, in a second possible implementation of the third aspect, the service policy includes when volume of data transmitted by the terminal device to the network device is greater than or equal to a threshold, determining to use a first beam to communicate with the network device, or when volume of data transmitted by the terminal device to the network device is less than the threshold, determining to use a second beam to communicate with the network device, where the first beam and the second beam are beams in the candidate serving beam set, and the first beam is different from the second beam.

With reference to the third aspect and the foregoing implementation of the third aspect, in a third possible implementation of the third aspect, the service policy includes when data transmitted by the terminal device to the network device is high-priority data, determining to use a first beam to communicate with the network device, or when data transmitted by the terminal device to the network device is low-priority data, determining to use a second beam to communicate with the network device, where the first beam and the second beam are beams in the candidate serving beam set, and the first beam is different from the second beam.

With reference to the third aspect and the foregoing implementation of the third aspect, in a fourth possible implementation of the third aspect, the service policy further includes when the first beam is determined to be used for communicating with the network device, and when data transmitted by the terminal device to the network device is high-priority data, determining to use a first transmission resource of the first beam to communicate with the network device, when the first beam is determined to be used for communicating with the network device, and when data transmitted by the terminal device to the network device is low-priority data, determining to use a second transmission resource of the first beam to communicate with the network device, where the first transmission resource is different from the second transmission resource, when the second beam is used for communicating with the network device, and when data transmitted by the terminal device to the network device is high-priority data, using a third transmission resource of the second beam to communicate with the network device, or when the second beam is used for communicating with the network device, and when data transmitted by the terminal device to the network device is low-priority data, using a fourth transmission resource of the second beam to communicate with the network device, where the third transmission resource is different from the fourth transmission resource.

Therefore, the terminal device may receive the service policy sent by the network device, and determine the serving beam according to the service policy. This can improve resource utilization. In addition, the network device can learn a priority of a data type, so that the network device determines a priority for scheduling the terminal device.

According to a fourth aspect, a communication method is provided, including sending, by a network device, a service policy to a terminal device, where the service policy is used to instruct the terminal device to determine a serving beam from a candidate serving beam set, and communicating, by the network device, with the terminal device by using the serving beam.

Therefore, according to the method provided in this embodiment of this application, the network device sends the service policy to the terminal device, and the terminal device selects the serving beam according to the service policy, so that the terminal device can flexibly select a serving beam depending an actual signal transmission status, and resource utilization can be improved.

With reference to the fourth aspect, in a first possible implementation of the fourth aspect, the service policy includes using a first beam to communicate with the network device when the terminal device transmits one of the following channels with the network device a physical downlink control channel (PDCCH), a physical uplink control channel (PUCCH), and a physical hybrid automatic repeat request indicator channel (PHICH), or using a second beam to communicate with the network device when the terminal device transmits one of the following channels with the network device a physical downlink shared channel (PDSCH) and a physical uplink shared channel (PUSCH), where the first beam and the second beam are beams in the candidate serving beam set, and the first beam is different from the second beam.

With reference to the fourth aspect and the foregoing implementation of the fourth aspect, in a second possible implementation of the fourth aspect, the service policy includes when volume of data transmitted by the terminal device to the network device is greater than or equal to a threshold, determining to use a first beam to communicate with the network device, or when volume of data transmitted by the terminal device to the network device is less than the threshold, determining to use a second beam to communicate with the network device, where the first beam and the second beam are beams in the candidate serving beam set, and the first beam is different from the second beam.

With reference to the fourth aspect and the foregoing implementation of the fourth aspect, in a third possible implementation of the fourth aspect, the service policy includes when data transmitted by the terminal device to the network device is high-priority data, determining to use a first beam to communicate with the network device, or when data transmitted by the terminal device to the network device is low-priority data, determining to use a second beam to communicate with the network device, where the first beam and the second beam are beams in the candidate serving beam set, and the first beam is different from the second beam.

With reference to the fourth aspect and the foregoing implementation of the fourth aspect, in a fourth possible implementation of the fourth aspect, the service policy further includes when the terminal device determines to use the first beam to communicate with the network device, and when data transmitted by the terminal device to the network device is high-priority data, determining that the terminal device uses a first transmission resource of the first beam to communicate with the network device, when the first beam is determined to be used for communicating with the network device, and when data transmitted by the terminal device to the network device is low-priority data, determining that the terminal device uses a second transmission resource of the first beam to communicate with the network device, where the first transmission resource is different from the second transmission resource, when the second beam is used for communicating with the network device, and when data transmitted by the terminal device to the network device is high-priority data, determining that the terminal device uses a third transmission resource of the second beam to communicate with the network device, or when the terminal device uses the second beam to communicate with the network device, and when data transmitted by the terminal device to the network device is low-priority data, determining that the terminal device uses a fourth transmission resource of the second beam to communicate with the network device, where the third transmission resource is different from the fourth transmission resource.

Therefore, the terminal device may determine a serving beam based on a size of a local data packet or a priority of a data type. This can improve resource utilization. In addition, the network device can learn a priority of a data type, so that the network device determines a priority for scheduling the terminal device.

According to a fifth aspect, a network device is provided, configured to perform the method according to any one of the first aspect or the possible implementations of the first aspect. Specifically, the network device includes units configured to perform the method according to any one of the first aspect or the possible implementations of the first aspect.

According to a sixth aspect, a network device is provided, configured to perform the method according to any one of the second aspect or the possible implementations of the second aspect. Specifically, the network device includes units configured to perform the method according to any one of the second aspect or the possible implementations of the second aspect.

According to a seventh aspect, a terminal device is provided, configured to perform the method according to any one of the third aspect or the possible implementations of the third aspect. Specifically, the terminal device includes units configured to perform the method according to any one of the third aspect or the possible implementations of the third aspect.

According to an eighth aspect, a terminal device is provided, configured to perform the method according to any one of the fourth aspect or the possible implementations of the fourth aspect. Specifically, the terminal device includes units configured to perform the method according to any one of the fourth aspect or the possible implementations of the fourth aspect.

According to a ninth aspect, a network device is provided, where the network device includes a transceiver, a memory, a processor, and a bus system. The transceiver, the memory, and the processor are connected by using the bus system. The memory is configured to store an instruction. The processor is configured to execute the instruction stored in the memory, to control the transceiver to receive and/or send a signal. In addition, when executing the instruction stored in the memory, the processor is configured to perform the method according to any one of the first aspect or the possible implementations of the first aspect.

According to a tenth aspect, a network device is provided, where the network device includes a transceiver, a memory, a processor, and a bus system. The transceiver, the memory, and the processor are connected by using the bus system. The memory is configured to store an instruction. The processor is configured to execute the instruction stored in the memory, to control the transceiver to receive and/or send a signal. In addition, when executing the instruction stored in the memory, the processor is configured to perform the method according to any one of the second aspect or the possible implementations of the second aspect.

According to a eleventh aspect, a terminal device is provided, where the terminal device includes a transceiver, a memory, a processor, and a bus system. The transceiver, the memory, and the processor are connected by using the bus system. The memory is configured to store an instruction. The processor is configured to execute the instruction stored in the memory, to control the transceiver to receive a signal and/or send a signal. In addition, when executing the instruction stored in the memory, the processor is configured to perform the method according to any one of the third aspect or the possible implementations of the third aspect.

According to a twelfth aspect, a terminal device is provided, where the terminal device includes a transceiver, a memory, a processor, and a bus system. The transceiver, the memory, and the processor are connected by using the bus system. The memory is configured to store an instruction. The processor is configured to execute the instruction stored in the memory, to control the transceiver to receive a signal and/or send a signal. In addition, when executing the instruction stored in the memory, the processor is configured to perform the method according to any one of the fourth aspect or the possible implementations of the fourth aspect.

According to a thirteenth aspect, a computer readable medium is provided, configured to store a computer program. The computer program includes units configured to perform the method according to any one of the first aspect or the possible implementations of the first aspect.

According to a fourteenth aspect, a computer readable medium is provided, configured to store a computer program. The computer program includes units configured to perform the method according to any one of the second aspect or the possible implementations of the second aspect.

According to a fifteenth aspect, a computer readable medium is provided, configured to store a computer program. The computer program includes units configured to perform the method according to any one of the third aspect or the possible implementations of the third aspect.

According to a sixteenth aspect, a computer readable medium is provided, configured to store a computer program. The computer program includes units configured to perform the method according to any one of the fourth aspect or the possible implementations of the fourth aspect.

BRIEF DESCRIPTION OF THE DRAWINGS

FIG. 3 is a schematic diagram of accessing a base station by UE according to an embodiment of this application;

FIG. 4 is a schematic flowchart of a method according to an embodiment of this application;

DETAILED DESCRIPTION OF ILLUSTRATIVE EMBODIMENTS

The following describes technical solutions in embodiments of this application with reference to accompanying drawings.

In the embodiments of this application, a terminal device may be user equipment (UE), an access terminal, a subscriber unit, a subscriber station, a mobile station, a mobile console, a remote station, a remote terminal, a mobile device, a user terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a future $5^{th}$ generation (5G) network, or the like. It should be understood that the UE is used as an example for description in the embodiments of this application.

Further, in the embodiments of this application, a network device may be a base station configured to communicate with a terminal device. For example, the base station may be a base transceiver station (BTS) in a Global System for Mobile Communications (GSM) system or a Code Division Multiple Access (CDMA) system, or may be a NodeB (NB) in a Wide Band Code Division Multiple Access (WCDMA) system, or may be an evolved NodeB (eNB or eNodeB) in an long term evolution (LTE) system. Alternatively, the base station may be a relay station, an access point, an in-vehicle device, a wearable device, a network device in a future 5G network, or the like. It should be understood that the base station is used as an example for description in the embodiments of this application.

Figure 1:
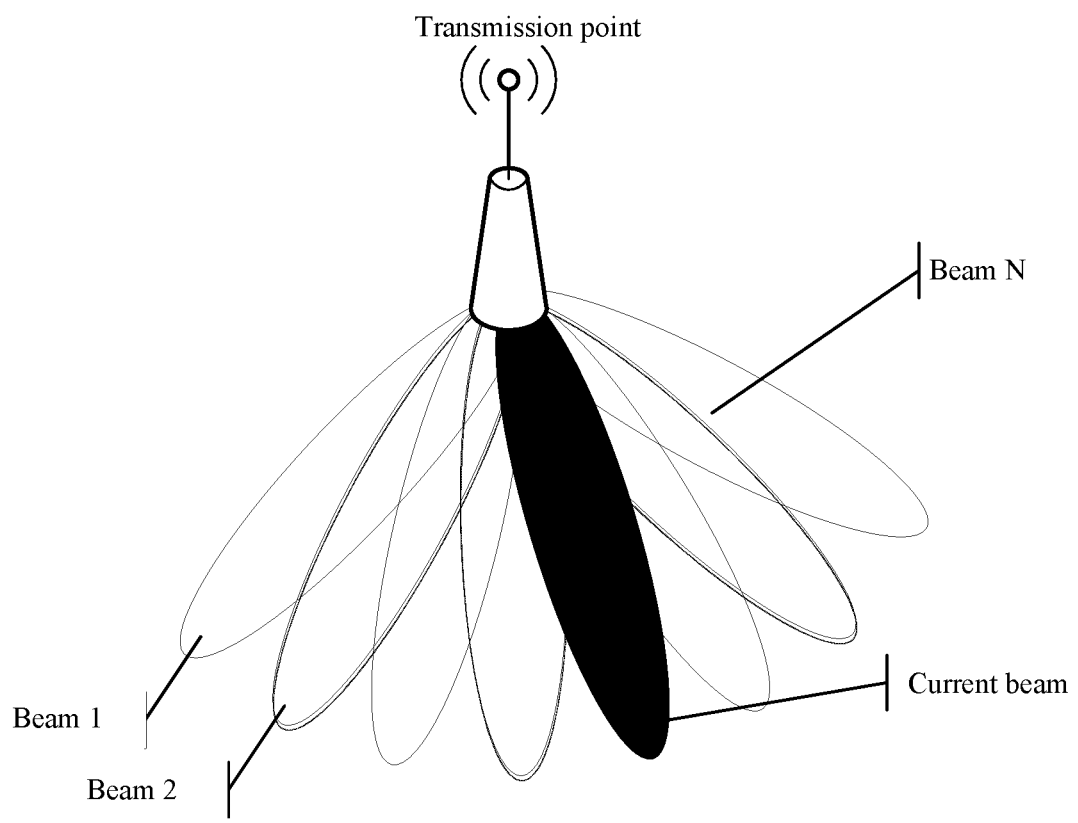
FIG. 1 is a schematic diagram of an antenna beam scenario to which this application may be applied.
Figure 2:
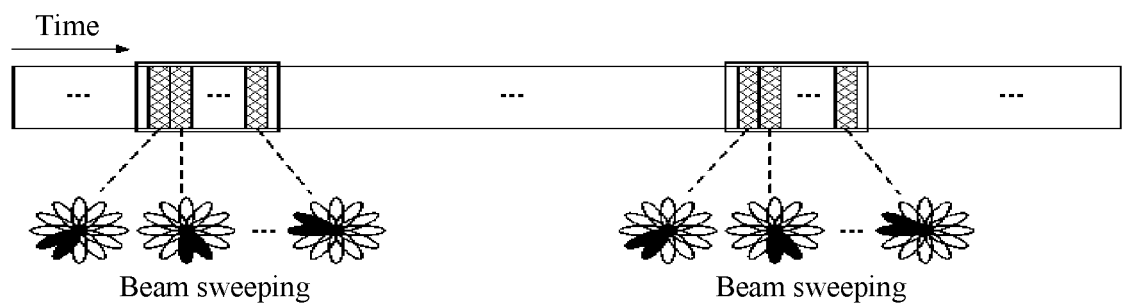
FIG. 2 is a schematic diagram of a beam sweeping scenario to which this application may be applied.

FIG. 2 is a schematic diagram of a beam sweeping scenario to which this application may be applied. A base station sends, in a TP based on a specific period, common information, including a reference signal (RS), synchronization information, or other basic information (such as system broadcast information) that are corresponding to each beam. To be specific, the TP sends the common information to different coverage areas in a time division manner. This process is usually referred to as beam sweeping. UE may learn corresponding basic access information based on the common information. The UE selects one or more beams for access. A beam currently providing uplink/downlink signal transmission for the UE is referred to as a serving beam. Within a beam sweeping time, the base station determines, depending on whether UE in a corresponding beam needs to be scheduled, whether to send or receive data in the beam.

It may be understood that beams in the embodiments of this application include a transmit beam or a receive beam, and is a radio wave that has a specific direction and shape in space and that is formed when at least one antenna port transmits or receives a radio signal. It can be learned that a beam has a specific coverage area. A method for forming a beam may include performing amplitude and/or phase weighting on data transmitted or received by at least one antenna port, to form a beam. Alternatively, another method may be used to form a beam, for example, adjusting a related parameter of an antenna unit. This is not particularly limited in the embodiments of this application.

For downlink data/control information transmission, a network device sends a related downlink channel in a serving beam of UE, for example, a physical downlink control channel (PDCCH), a physical downlink shared channel (PDSCH), or a physical hybrid automatic repeat request indicator channel (PHICH for short).

For uplink data/control information transmission, if a network device needs to send scheduling information each time data or control information is transmitted, the network device sends downlink control information in a serving beam of UE, for example, a PDCCH, where the PDCCH carries specific instruction information about sending uplink data or control information in the serving beam by the UE, or if a network device does not need to send scheduling information each time data or control information is transmitted, UE needs to send corresponding information in a specified resource location in a serving beam.

A general process of accessing a base station by UE is shown in FIG. 3. FIG. 3 is a schematic diagram of accessing a base station by UE according to an embodiment of this application. First, the UE selects a beam to initiate random access, such as a wide beam. Then the network device instructs the UE to perform measurement on each narrow beam in the wide beam and notify the network device of a corresponding measurement result. Usually, the UE reports measurement results of a plurality of beams, so that the base station determines a serving beam of the UE. The serving beam determined by the base station is usually a narrow beam. In a subsequent process, the UE listens to control information or data information delivered by the base station in the narrow beam.

It should be understood that a wide beam is a type of beam whose spatial coverage area includes a plurality of narrow beams, and a narrow beam is a type of beam whose spatial coverage area is smaller than that of the wide beam. Usually, a wide beam can provide a relatively large coverage area, but provides a relatively low antenna gain, and therefore is not suitable for sending a large data packet, and a narrow beam can provide a relatively high antenna gain although cannot provide a relatively large coverage area, and therefore is suitable for sending a large data packet.

Usually, if a base station requests UE to report a plurality of beams with best signal quality, the base station selects a beam with best quality from the beams as a serving beam, and then the UE keeps using the beam as a serving beam. As a result, a plurality of UEs may use different beams, and when a network device schedules the UE to send a relatively small data packet, resource utilization is relatively low.

FIG. 4 is a schematic flowchart of a method according to an embodiment of this application. The method is performed by a network device. For example, the network device may be a base station. As shown in FIG. 4, the method 400 includes the following steps.

Step 410: A network device sends instruction information to a terminal device in a first time period by using a first serving beam, where the instruction information is used to instruct the terminal device to communicate with the network device in a second time period by using a second serving beam.

Step 420: The network device communicates with the terminal device in the second time period by using the second serving beam according to the instruction information, where the first time period is earlier than the second time period.

To be specific, the network device sends the instruction information to the terminal device in a broadcast or unicast form, where the instruction information is used to instruct the terminal device to communicate with the network device in the second time period by using the second serving beam. It should be understood that, that the network device communicates with the UE may be that the network device sends a downlink signal to the UE, or may be that the UE sends an uplink signal to the network device. This is not limited in this application.

Therefore, according to the method provided in this embodiment of this application, a serving beam used for communication between the network device and the user equipment can be dynamically adjusted in different time periods depending on a network status, improving resource utilization.

Optionally, in an embodiment of this application, the network device sends a control channel in the first time period by using the first serving beam, where the control channel is used to carry the instruction information, and the network device transmits a data channel with the terminal device in the second time period by using the second serving beam, where the data channel is used to carry data information or control information used for communicating with the terminal device.

Specifically, the control channel may include one of the following: a PDCCH, a PUCCH, and a PHICH, and the data channel includes one of the following: a PDSCH and a PUSCH. It should be understood that the foregoing channels are merely examples, and this is not limited in this application.

Figure 5:
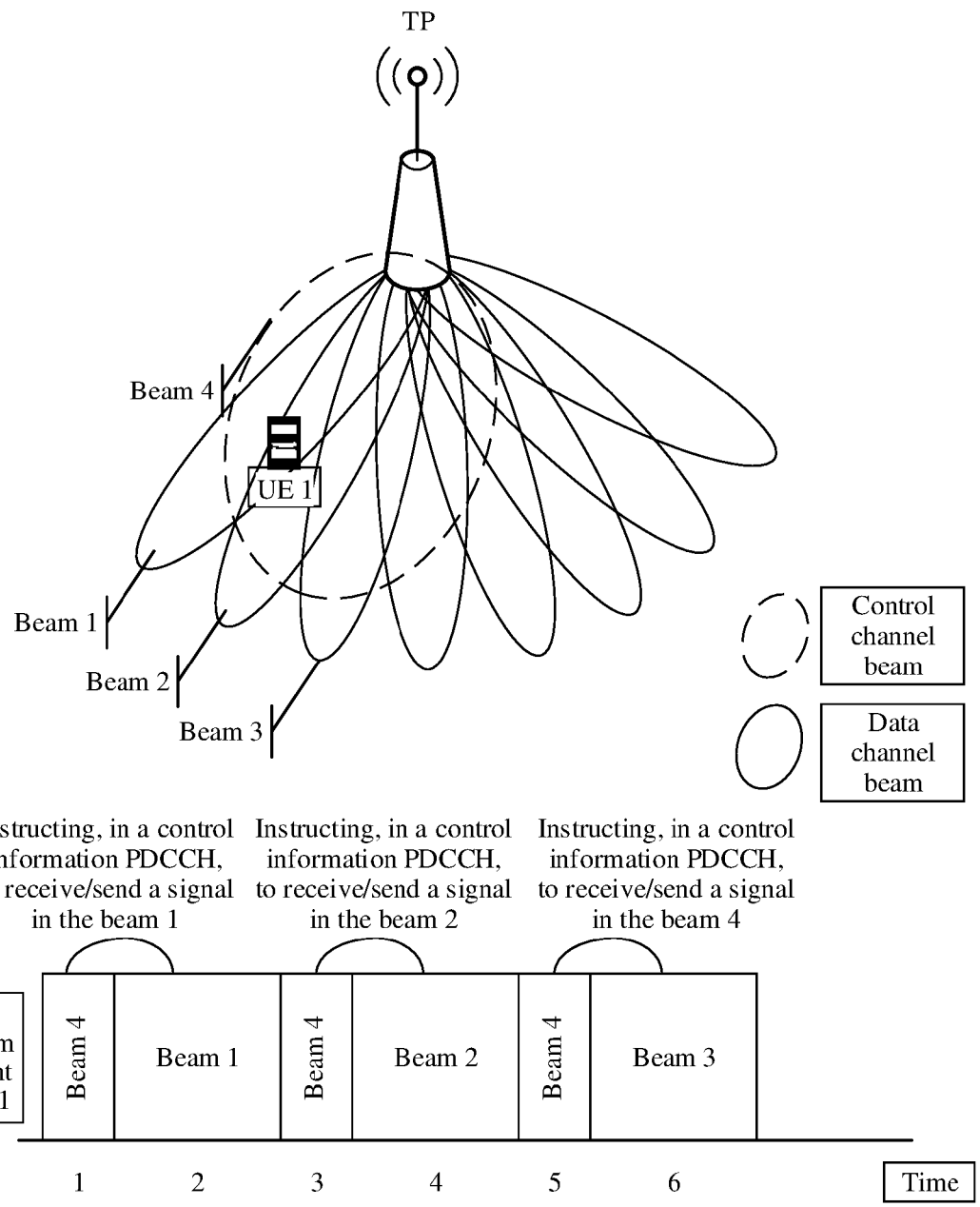
FIG. 5 is a schematic flowchart of a method according to an embodiment of this application.

Specifically, FIG. 5 is a schematic flowchart of a method according to an embodiment of this application. As shown in FIG. 5, a network device sends a PDCCH to UE in a first time period whose identifier is 1, that is, the network device communicates with the UE in the first time period by using a beam 4, to instruct the UE to communicate with the network device in a second time period whose identifier is 2 by using a beam 1, the network device sends a PDCCH to the UE in a third time period whose identifier is 3, that is, the network device communicates with the UE in the third time period by using the beam 4, to instruct the UE to communicate with the network device in a fourth time period whose identifier is 4 by using a beam 2, and the network device sends a PDCCH to the UE in a fifth time period whose identifier is 5, that is, the network device communicates with the UE in the fifth time period by using the beam 4, to instruct the UE to communicate with the network device in a sixth time period whose identifier is 6 by using the beam 1.

Figure 6:
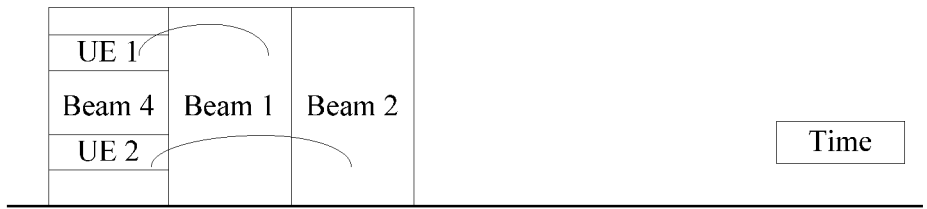
FIG. 6 is a schematic flowchart of a method according to another embodiment of this application.

Usually, a control channel and a data channel are sent periodically. To be specific, a control channel and a data channel are sent in a period, and a control channel and a data channel are sent again in a next period. That is, in one period, a control channel is sent in an earlier time period, and a data channel is sent in a later time period. In this embodiment of this application, control channels corresponding to a plurality of UEs may be sent to the plurality of UEs in a first time period, to instruct the plurality of UEs to communicate by using different beams in second time periods corresponding to the plurality of UEs. Specifically, FIG. 6 is a schematic flowchart according to another embodiment of this application. As shown in FIG. 6, in a first time period, a network device sends instruction information 1 and instruction information 2 to UE 1 and UE 2 respectively by using a beam 1. The instruction information 1 is used to instruct the UE 1 to transmit a data channel or a control channel from a moment T1 to a moment T3 by using the beam 1. The instruction information 2 is used to instruct the UE 2 to transmit a data channel or a control channel from the moment T3 to a moment T2 by using a beam 2. Therefore, the network device may serve a plurality of different UEs by using a plurality of different serving beams in a period from the moment T1 to the moment T2, so as to improve resource utilization.

It should be understood that, before the network device instructs the terminal device to communicate by using a serving beam, the network device further needs to determine the serving beam of the terminal device. The following describes in detail a process of determining the serving beam of the terminal device by the network device.

Optionally, in an embodiment of this application, the method includes sending, by the network device, a first reporting request to the terminal device, where the first reporting request includes identification information of each beam in a first beam set, and the first reporting request is used to request the terminal device to report signal quality of each beam in the first beam set, and receiving, by the network device, a measurement report sent by the terminal device, where the measurement report sent by the terminal device includes the signal quality of each beam in the first beam set, and the first serving beam and the second serving beam belong to the first beam set.

It should be further understood that at least one of the first serving beam and the second serving beam belongs to the first beam set.

It should be understood that the first reporting request is used to request the terminal device to report the signal quality of each beam in the first beam set. It should be understood that the first beam set may include at least one beam, and there may be one or more serving beams. This is not limited in this application.

Specifically, in this case, when the first reporting request carries the identification information (for example, a beam ID) of each beam in the first beam set, the first reporting request is used to request the UE to report the beam signal quality of each beam in the first beam set. It should be understood that the signal quality mentioned herein may be signal strength, for example, (RSRP), a signal-to-noise ratio, or Reference Signal Received Quality (RSRQ). The terminal device measures the signal quality of each beam in the first beam set according to the first reporting request, and then sends the measurement report to the network device, where the measurement report carries the signal quality corresponding to each beam in the first beam set. When the first beam set includes more than one beam, in addition to information about each beam, the measurement report sent by the terminal device further includes a beam ID corresponding to the beam. After receiving the measurement report sent by the terminal device, the network device determines, based on the measurement report, a serving beam used for communicating with the terminal device.

It should be understood that, in this case, the first beam set is determined by the network device.

Optionally, in an embodiment of this application, the method further includes sending, by the network device, a second reporting request to the terminal device, where the second reporting request includes a signal threshold condition, and the second reporting request is used to request the terminal device to report identification information of beams that satisfy the signal threshold condition, and receiving, by the network device, a measurement report sent by the terminal device, where the measurement report sent by the terminal device includes the identification information of the beams that satisfy the signal threshold condition, the beams that satisfy the signal threshold condition constitute a second beam set, and the first serving beam and the second serving beam belong to the second beam set.

It should be understood that the first reporting request is used to request the terminal device to report the identification information of each beam in the second beam set. It should be understood that the second beam set may include at least one beam, and there may be one or more serving beams. This is not limited in this application.

It should be further understood that at least one of the first serving beam and the second serving beam belongs to the second beam set.

In this case, when the second reporting request carries the signal threshold condition, the second reporting request is used to request the terminal device to report a beam ID of each beam in the second beam set. That is, after receiving the signal threshold condition, the terminal device determines the beams that satisfy the signal threshold condition as beams in the second beam set. Further, the terminal device sends the beam ID of each beam in the second beam set to the network device by using the measurement report. After receiving the measurement report sent by the terminal device, the network device determines, based on the measurement report, a serving beam used for communicating with the terminal device, so as to communicate with the terminal device by using the serving beam. It should be understood that the measurement report reported by the terminal device may further include beam signal quality of each beam in the second beam set, so that the network device determines the serving beam based on the beam signal quality of each beam and the beam ID of each beam.

That is, in this case, the second beam set is a set determined by the terminal device based on the signal threshold condition.

It should be understood that a beam in the first beam set may be a wide beam or a narrow beam, and a beam in the second beam set may be a wide beam or a narrow beam. This is not limited in this application.

It should be further understood that the signal threshold condition may be selecting a beam whose signal quality is higher than a signal threshold as a beam in the second beam set. For example, when the signal threshold is signal strength, the signal threshold may be −92 dbm, −95 dbm, or the like. When the signal threshold is a signal-to-noise ratio, the signal threshold may be 6 db or the like. Alternatively, the signal threshold condition may be selecting a beam whose beam signal quality difference falls within a signal threshold range as a beam in the second beam set, or the like. This is not limited in this application.

It should be further understood that the second beam set may be the same as the first beam set, and the serving beam belongs to the second beam set or the first beam set.

Therefore, in this embodiment of this application, the reporting request is sent to the terminal device, to request the terminal device to report the signal quality of each beam in the specified first beam set, or when the terminal device reports the identification information of the beams that satisfy the signal threshold condition and that constitute the second beam set, the network device determines a serving beam from the first beam set or the second beam set. This can help improve resource utilization of a serving beam.

Figure 7:
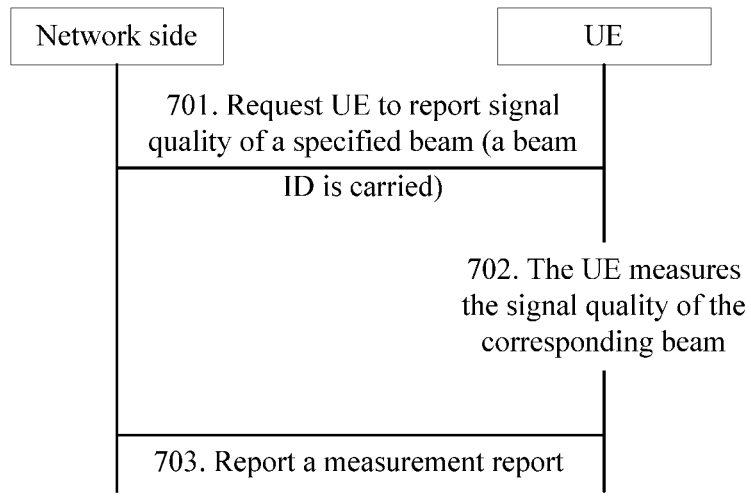
FIG. 7 is a schematic flowchart of a method according to an embodiment of this application.

FIG. 7 is a schematic flowchart of a method according to an embodiment of this application. As shown in FIG. 7, the method includes the following steps.

Step 701: A network device sends a reporting request to UE, to request the UE to report signal quality of a specified beam, where the reporting request carries a beam ID of the specified beam, and the specified one or more beams constitute the first beam set described in the embodiment shown in FIG. 4.

Step 702: The UE measures, according to the reporting request, beam signal quality of a beam corresponding to the beam ID.

Step 703: The UE reports a measurement report to the network device, where the measurement report carries the beam signal quality of the beam corresponding to the beam ID. Further, if the network device requests the UE to report signal quality of more than one specified beam, the measurement report reported by the UE should carry a beam ID of each beam and corresponding beam signal quality.

It should be understood that the network device may further receive a measurement report sent by another UE. Further, the network device can determine a serving beam based on the measurement reports reported by the UE and the another UE, and provide the serving beam for the UE or the another UE for use, so as to transmit an uplink signal or a downlink signal.

Figure 8:
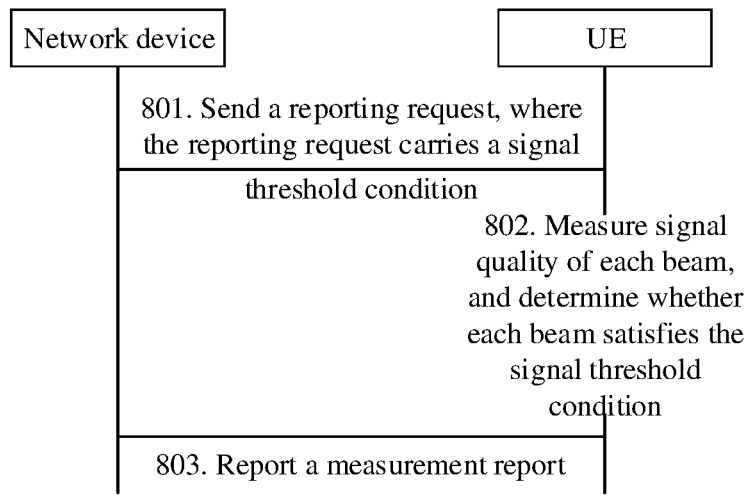
FIG. 8 is a schematic flowchart of a method according to another embodiment of this application.

FIG. 8 is a schematic flowchart of a method according to another embodiment of this application. As shown in FIG. 8, the method includes the following steps.

Step 801: A network device sends a reporting request to UE, where the reporting request carries a signal threshold condition, and when one beam or a plurality of beams satisfy the signal threshold condition, signal quality of the one beam or a beam ID of each of the plurality of beams need to be reported.

Step 802: The UE measures beam signal quality of each of all beams that can be detected, and determines whether each beam satisfies the signal threshold condition.

Step 803: The UE reports a measurement report to the network device, where the measurement report carries a beam ID of a beam that satisfies the signal threshold condition, and further, the measurement report reported by the UE may carry a beam ID of each beam and corresponding beam signal quality.

It should be understood that a set of beams that satisfy the signal threshold condition in step 803 is the second beam set described in the embodiment shown in FIG. 4.

It should be understood that the network device may further receive a measurement report sent by another one or more UEs. Further, the network device can determine a serving beam based on the measurement reports reported by the UE and the another one or more UEs, and provide the serving beam for the UE or the another one or more UEs for use, so as to transmit an uplink signal or a downlink signal with the UEs.

Optionally, in an embodiment of this application, before the network device communicates with the terminal device by using the serving beam, the method further includes sending a reporting request to a second terminal device, where reporting request is used to request the second terminal device to report beam information of each beam in a third beam set to the network device, and the beam information includes a beam identifier and/or beam signal quality, receiving a measurement report sent by the second terminal device, where the measurement report of the second terminal device carries the beam information of each beam in the third beam set, and determining, by the network device, the serving beam from the third beam set and the second beam set, or determining, by the network device, the serving beam from the third beam set and the first beam set, where when the network device determines the serving beam from the third beam set and the first beam set, the serving beam is a common beam of the first beam set and the third beam set, or when the network device determines the serving beam from the third beam set and the second beam set, the serving beam is a common beam of the second beam set and the third beam set.

It should be understood that the third beam set and the first beam set have an intersection set, or the third beam set and the second beam set have an intersection set.

That is, if a plurality of terminal devices use different beams, and each beam serves a quite few terminal devices, resource utilization is low. In this case, using the common beam determined based on the intersection set of the first beam set and the third beam set or the intersection set of the second beam set and the third beam set improves resource utilization during communication between the network device and the terminal device.

It should be understood that the network device determines a serving beam based on a quantity of terminals whose beam signal quality satisfies a specific threshold and/or based on a size of a data packet that needs to be transmitted with the UE. This is not limited in this application.

That is, the network device can determine a serving beam based on a size of a data packet that needs to be transmitted with a terminal device in a coverage area of each beam, improving reliability of data transmission between the network device and the terminal device, or the network device can determine a serving beam of a current moment based on a quantity of terminal devices covered in each beam, improving utilization of network resources.

Optionally, in an embodiment of this application, the sending a reporting request to UE includes sending the reporting request to the UE by using a physical layer control channel or a Media Access Control control element (MAC Control Element).

Optionally, in an embodiment of this application, the reporting request may be carried in a Radio Resource Control (RRC) message.

Figure 9:
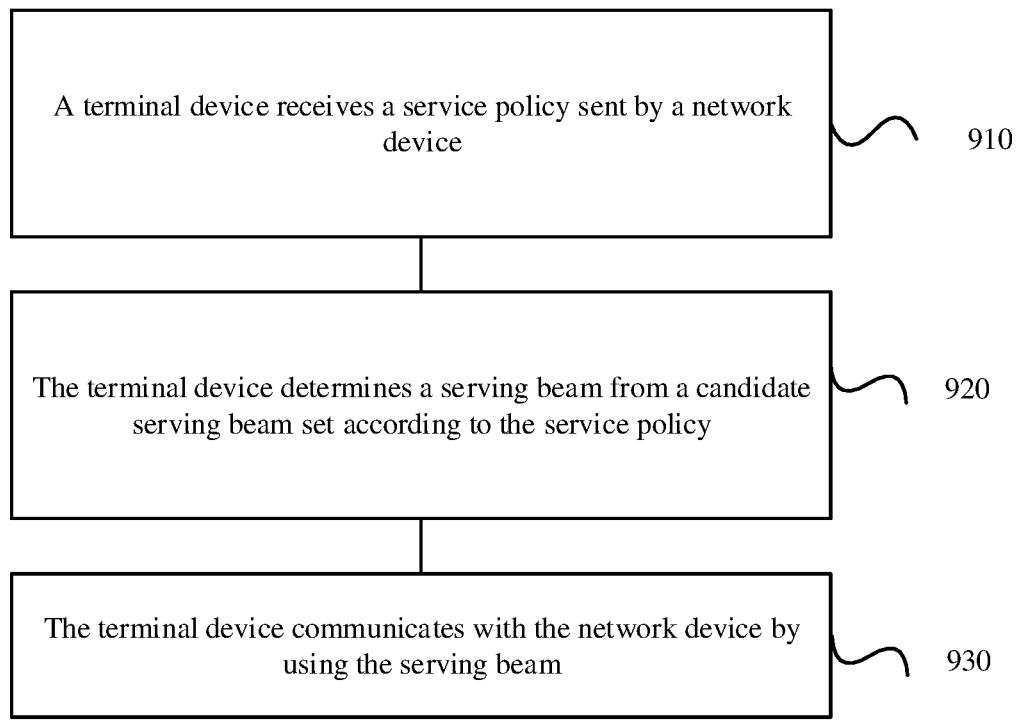
FIG. 9 is a schematic flowchart of a method according to another embodiment of this application.

FIG. 9 is a schematic flowchart of a method according to another embodiment of this application. The method 900 includes the following steps.

Step 910: A terminal device receives a service policy sent by a network device.

Step 920: The terminal device determines a serving beam from a candidate serving beam set according to the service policy.

Step 930: The terminal device communicates with the network device by using the serving beam.

In other words, the network device may instruct, by sending the service policy to the terminal device, the terminal device to determine the serving beam from the candidate serving beam set according to the service policy.

Therefore, according to the method provided in this embodiment of this application, the terminal device receives the service policy sent by the network device, and the terminal device selects the serving beam according to the service policy, so that the terminal device can flexibly select a serving beam depending an actual signal transmission status, and resource utilization can be improved.

Optionally, in an embodiment of this application, the service policy includes using a first beam to communicate with the terminal device when the network device transmits one of the following channels with the network device: a physical downlink control channel PDCCH, a physical uplink control channel PUCCH, and a physical hybrid automatic repeat request indicator channel PHICH, or using a second beam to communicate with the network device when the terminal device transmits one of the following channels with the network device: a physical downlink shared channel PDSCH and a physical uplink shared channel PUSCH, where the first beam and the second beam are beams in the candidate serving beam set, and the first beam is different from the second beam.

In other words, the network device may instruct the terminal device to transmit a control channel with the network device in the first beam, or may instruct the terminal device to transmit a data channel with the network device in the second beam.

For sending of service policy information, the network device may send the service policy by using a MAC control element, a physical downlink control channel, or an RRC message.

If the first beam is a wide beam and the second beam is a narrow beam, the control channel is transmitted via the wide beam, and the data channel is transmitted via the narrow beam. In this way, transmission control information of more terminal devices can be transmitted via a same wide beam, and reliable transmission of the data channel is ensured by using the narrow beam.

Optionally, in an embodiment of this application, the service policy includes when volume of data transmitted by the terminal device to the network device is greater than or equal to a threshold, determining to use a first beam to communicate with the network device, or when volume of data transmitted by the terminal device to the network device is less than the threshold, determining to use a second beam to communicate with the network device, where the first beam and the second beam are beams in the candidate serving beam set, and the first beam is different from the second beam.

In other words, the terminal device determines, by determining volume of data transmitted between the network device and the terminal device, a beam to be used for communication. Specifically, when volume of data to be transmitted by the terminal device to the network device is greater than a threshold of data volume, the terminal device selects, according to the service policy, the first beam to transmit the data, otherwise, the terminal device selects the second beam to transmit the data.

It should be understood that the first beam may be a narrow beam, and the second beam may be a wide beam.

It should be further understood that the threshold of data volume may be preconfigured on the terminal device, or may be delivered to the terminal device by using the service policy. This is not limited in this application. For example, the threshold of data volume may be 100 bytes or 150 bytes. This is not limited in this application.

Optionally, in an embodiment of this application, the service policy includes when data transmitted by the terminal device to the network device is high-priority data, determining to use a first beam to communicate with the network device, or when data transmitted by the terminal device to the network device is low-priority data, determining to use a second beam to communicate with the network device, where the first beam and the second beam are beams in the candidate serving beam set, and the first beam is different from the second beam.

In this case, the high-priority data may be data corresponding to a logical channel whose priority is higher than a specific threshold, for example, may be video service data or voice communication service data, and the low-priority data may be data corresponding to a logical channel whose priority is lower than a specific threshold, for example, may be web page browsing service data. A high/low priority division policy may be preconfigured on the terminal device, or may be delivered to the terminal device by using the service policy of the network device. This is not limited in this application.

Therefore, according to the method provided in this embodiment of this application, the service policy can be sent to the terminal device, and the terminal device selects the serving beam according to the service policy, so that the terminal device can flexibly select a serving beam depending an actual signal transmission status, and resource utilization can be improved.

Optionally, in an embodiment of this application, the service policy further includes when the first beam is determined to be used for communicating with the network device, and when data transmitted by the terminal device to the network device is high-priority data, determining to use a first transmission resource of the first beam to communicate with the network device, when the first beam is determined to be used for communicating with the network device, and when data transmitted by the terminal device to the network device is low-priority data, determining to use a second transmission resource of the first beam to communicate with the network device, where the first transmission resource is different from the second transmission resource, when the second beam is used for communicating with the network device, and when data transmitted by the terminal device to the network device is high-priority data, using a third transmission resource of the second beam to communicate with the network device, or when the second beam is used for communicating with the network device, and when data transmitted by the terminal device to the network device is low-priority data, using a fourth transmission resource of the second beam to communicate with the network device, where the third transmission resource is different from the fourth transmission resource.

Specifically, when the terminal device transmits some uplink data by using a beam, the network device does not know priorities of data packets to be sent by the terminal device. If the priorities of the data packets to be sent by the terminal device are relatively high, the network device needs to schedule these small packets as soon as possible, instead of considering only resource utilization.

For example, for a terminal device that encounters uplink out-of-synchronization, when data or control information (for example, MAC layer control information) needs to be transmitted, first, the terminal device needs to send a preamble sequence. After receiving a corresponding preamble, the network device schedules the terminal device to send a buffer status report (BSR). After receiving the BSR, a network device schedules the terminal device to send corresponding data. If the network device does not know a priority of a data packet to be sent by the terminal device, the network device may schedule, after a long time after receiving the preamble sequence, the terminal device to send the corresponding data.

For another example, for a terminal device that achieves uplink synchronization, when the terminal device needs to transmit data information or control information (for example, MAC layer control information), the terminal device needs to first send a scheduling request (SR) to a network device. After a network side receives the corresponding SR, the network side schedules the terminal device to report a BSR. After receiving the BSR, the network side schedules the terminal device to send corresponding data. If the network device does not know a priority of a data packet to be sent by the terminal device, the network device may schedule, after a long time after receiving the SR, the terminal device to send the corresponding data.

Therefore, when the network device receives, on the first transmission resource, an uplink signal sent by the terminal device, the network device can determine, based on a resource attribute of the first transmission resource, a priority of uplink data to be sent by the terminal device, so as to further determine a priority for scheduling the terminal device. The resource attribute includes at least one of a time domain resource attribute, a frequency domain resource attribute, and a code domain resource attribute of the first transmission resource.

It should be understood that, when the network device receives, on the second transmission resource, the third transmission resource, or the fourth transmission resource, an uplink signal sent by the terminal device, the network device can also determine a priority for scheduling the terminal device.

Optionally, in an embodiment of this application, the method further includes sending, by the network device, a notification message to the terminal device, where the notification message is used to instruct the terminal device to send an uplink signal on the first transmission resource.

Therefore, the network device indicates the terminal device first transmission resources corresponding to data packets with different priorities transmitted by the terminal device. It should be understood that the data packets with different priorities may be transmitted by using different time-frequency resources, or the data packets with different priorities may be transmitted by using different code domain resources, for example, by using a preamble code resource or an SR code resource. By receiving the uplink signal of the terminal device on the first transmission resource, the network device can learn a priority of a data packet corresponding to the uplink signal, and therefore can determine a priority for scheduling the terminal device.

In other words, a higher priority of the data packet corresponding to the uplink signal of the terminal device indicates a higher priority for scheduling the terminal device by the network device, and a lower priority of the data packet corresponding to the uplink signal of the terminal device indicates a lower priority for scheduling the terminal device by the network device.

It should be understood that a high-priority uplink signal is usually a data packet that has a high signal quality QCI requirement. For example, a signal sent when the terminal device performs beam switching according to an instruction of the network device is a high-priority uplink signal.

It should be further understood that the network device may send the notification message to the terminal device by using a broadcast message or a dedicated message. This is not limited in this application.

Therefore, the terminal device may receive the service policy sent by the network device, and determine the serving beam according to the service policy. This can improve resource utilization. In addition, the network device can learn a priority of a data type, so that the network device determines a priority for scheduling the terminal device.

The foregoing describes in detail the method processes in the embodiments of this application with reference to FIG. 1 to FIG. 9. The following describes in detail a network device and a terminal device in the embodiments of this application with reference to FIG. 10 to FIG. 13.

Figure 10:
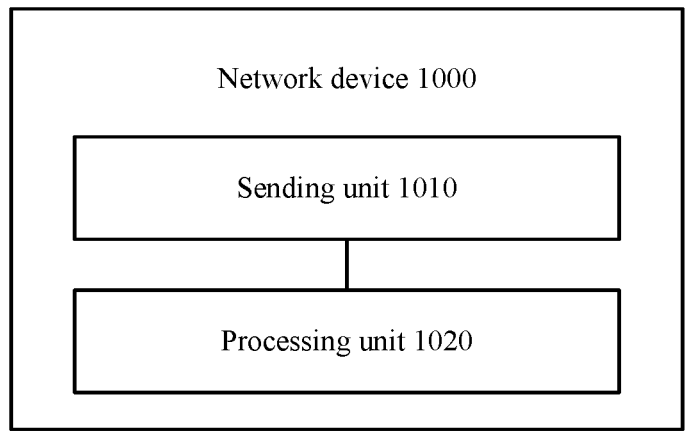
FIG. 10 is a schematic block diagram of a network device 1000 according to an embodiment of this application.

FIG. 10 is a schematic block diagram of a network device 1000 according to an embodiment of this application. The network device 1000 can perform the steps performed by the network device in the methods shown in FIG. 1 to FIG. 9. To avoid repetition, details are not described herein again. The network device 1000 includes a sending unit 1010, where the sending unit 1010 is configured to send instruction information to a terminal device in a first time period by using a first serving beam, and the instruction information is used to instruct the terminal device to communicate with the network device in a second time period by using a second serving beam, and a processing unit 1020, where the processing unit 1020 is configured to communicate with the terminal device in the second time period by using the second serving beam according to the instruction information, and the first time period is earlier than the second time period.

Therefore, according to the network device 1000 provided in this embodiment of this application, a serving beam used for communication between the network device and the terminal device can be dynamically adjusted in different time periods depending on a network status, improving resource utilization.

Figure 11:
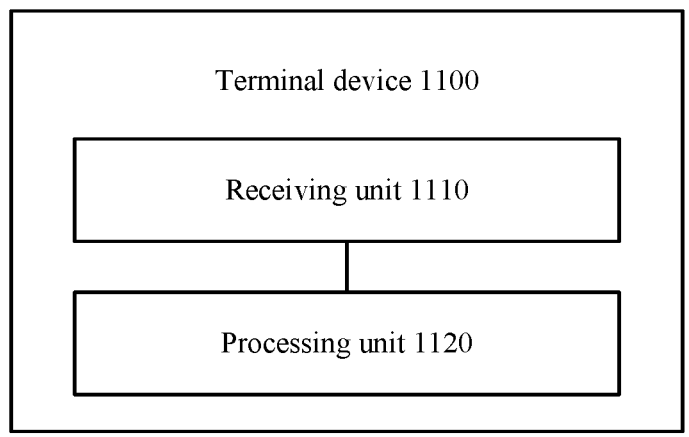
FIG. 11 is a schematic block diagram of a terminal device 1100 according to an embodiment of this application.

FIG. 11 is a schematic block diagram of a terminal device 1100 according to an embodiment of this application. The terminal device 1100 can perform the steps performed by the terminal device in the methods shown in FIG. 1 to FIG. 9. To avoid repetition, details are not described herein again. The terminal device 1100 includes a receiving unit 1110, where the receiving unit 1110 is configured to receive a service policy sent by a network device, and a processing unit 1120, where the processing unit 1120 is configured to determine a serving beam from a candidate serving beam set according to the service policy, and the processing unit is further configured to communicate with the network device by using the serving beam.

Therefore, according to the terminal device 1100 provided in this embodiment of this application, the terminal device receives the service policy sent by the network device, and the terminal device selects the serving beam according to the service policy, so that the terminal device can flexibly select a serving beam depending an actual signal transmission status, and resource utilization can be improved.

Figure 12:
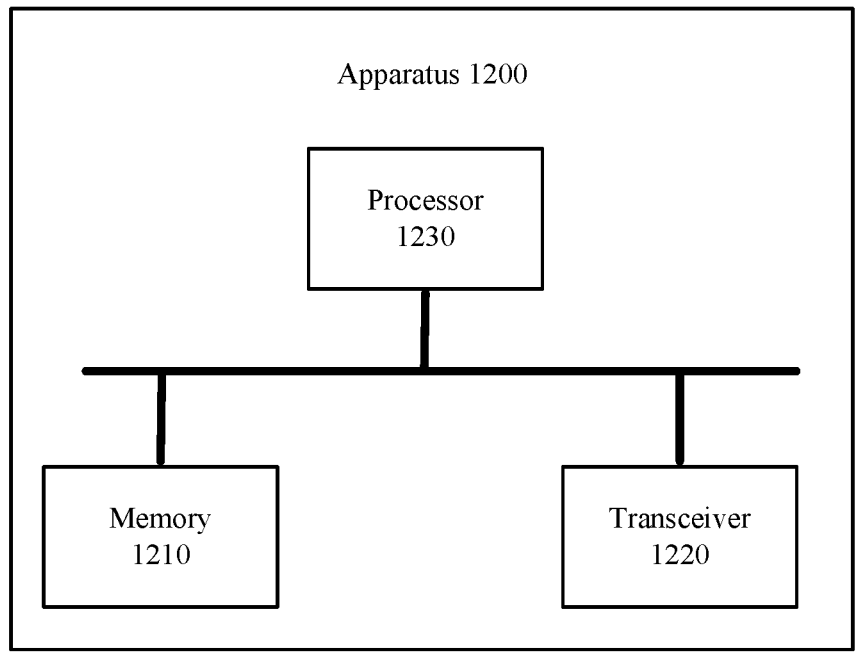
FIG. 12 is a schematic structural block diagram of an apparatus 1200 according to another embodiment of this application.

FIG. 12 is a schematic structural block diagram of an apparatus 1200 according to another embodiment of this application. It should be understood that the apparatus 1200 can perform the steps performed by the network device in the methods shown in FIG. 1 to FIG. 9. To avoid repetition, details are not described herein again. The apparatus 1200 includes a memory 1210, configured to store a program, a transceiver 1220, configured to communicate with another device, and a processor 1230, configured to execute the program in the memory 1210, where the processor 1230 is connected to the memory 1210 and the transceiver 1220, and is configured to execute the instruction stored in the memory 1210, so as to perform the following steps when executing the instruction sending instruction information to a terminal device in a first time period by using a first serving beam, where the instruction information is used to instruct the terminal device to communicate with the network device in a second time period by using a second serving beam, and communicating with the terminal device in the second time period by using the second serving beam according to the instruction information, where the first time period is earlier than the second time period.

Therefore, according to the apparatus 1200 provided in this embodiment of this application, a serving beam used for communication between the network device and the terminal device can be dynamically adjusted in different time periods depending on a network status, improving resource utilization.

Figure 13:
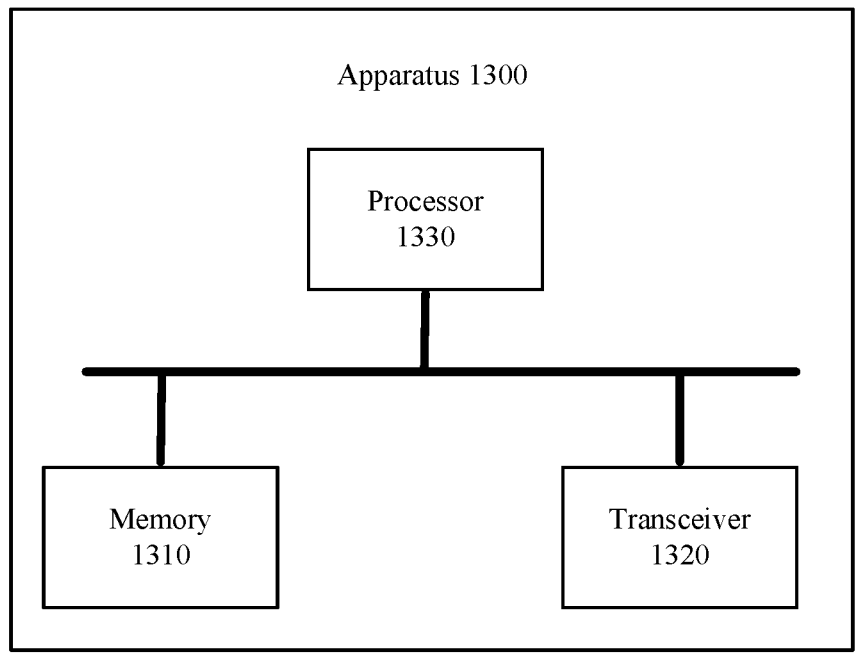
FIG. 13 is a schematic structural block diagram of an apparatus 1300 according to another embodiment of this application.

FIG. 13 is a schematic structural block diagram of an apparatus 1300 according to another embodiment of this application. It should be understood that the apparatus 1300 can perform the steps performed by the terminal device in the methods shown in FIG. 1 to FIG. 9. To avoid repetition, details are not described herein again. The apparatus 1300 includes a memory 1310, configured to store a program, a transceiver 1320, configured to communicate with another device, and a processor 1330, configured to execute the program in the memory 1310, where the processor 1330 is connected to the memory 1310 and the transceiver 1320, and is configured to execute the instruction stored in the memory 1310, so as to perform the following steps when executing the instruction receiving a service policy sent by a network device, determining a serving beam from a candidate serving beam set according to the service policy, and communicating with the network device by using the serving beam.

Therefore, according to the apparatus 1300 provided in this embodiment of this application, the terminal device receives the service policy sent by the network device, and the terminal device selects the serving beam according to the service policy, so that the terminal device can flexibly select a serving beam depending an actual signal transmission status, and resource utilization can be improved.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or may not be performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a terminal device, a service policy from a network device, wherein the service policy instructs the terminal device which serving beam of a candidate serving beam set to select;
determining, by the terminal device, the serving beam from the candidate serving beam set according to the service policy; and
communicating, by the terminal device, with the network device by using the serving beam;
wherein the service policy comprises:

using a first beam to communicate with the network device when the terminal device transmits one of the following channels with the network device: a physical downlink control channel (PDCCH), a physical uplink control channel (PUCCH), or a physical hybrid automatic repeat request indicator channel (PHICH); or using a second beam to communicate with the network device when the terminal device transmits one of the following channels with the network device: a physical downlink shared channel (PDSCH) or a physical uplink shared channel (PUSCH); and wherein the first beam and the second beam are beams in the candidate serving beam set, and the first beam is different from the second beam.

2. An apparatus, comprising:
a receiver;
a processor; and
a non-transitory computer-readable storage medium storing a program to be executed by the processor, the program including instructions to:
  receive, through the receiver, a service policy from a network device, wherein the service policy instructs the apparatus which serving beam of a candidate serving beam set to select;
  determine the serving beam from the candidate serving beam set according to the service policy; and
  enable a terminal device to communicate with the network device by using the serving beam; and
wherein the service policy comprises:
  when data transmitted by the terminal device to the network device is high-priority data, determining to use a first beam to communicate with the network device; or
  when data transmitted by the terminal device to the network device is low-priority data, determining to use a second beam to communicate with the network device; and
wherein the first beam and the second beam are beams in the candidate serving beam set, and the first beam is different from the second beam.

3. The apparatus according to claim 2, wherein the service policy further comprises:
  when the first beam is determined to be used for communicating with the network device, and when data transmitted by the terminal device to the network device is high-priority data, determining to use a first transmission resource of the first beam to communicate with the network device.

4. The apparatus according to claim 3, wherein the first transmission resource comprises a preamble code resource or a scheduling request (SR) code resource.

5. The apparatus according to claim 3, wherein the high-priority data indicates a higher priority for scheduling the terminal device by the network device; and
  wherein the low-priority data indicates a lower priority for scheduling the terminal device by the network device.

6. A non-transitory processor-readable medium having processor-executable instructions stored thereon for a terminal device, the processor-executable instructions, when executed by a processor, causing the terminal device to perform:
  receiving a service policy from a network device, wherein the service policy instructs the terminal device which serving beam of a candidate serving beam set to select;
  determining the serving beam from the candidate serving beam set according to the service policy; and
  communicating with the network device by using the serving beam; and
wherein the service policy comprises at least one of:
  when volume of data transmitted by the terminal device to the network device is greater than or equal to a threshold, determining to use a first beam to communicate with the network device; or
  when volume of data transmitted by the terminal device to the network device is less than the threshold, determining to use a second beam to communicate with the network device; and
wherein the first beam and the second beam are beams in the candidate serving beam set, and the first beam is different from the second beam.

7. The method according to claim 1, wherein the service policy comprises using the first beam to communicate with the network device when the terminal device transmits the PDCCH.

8. The method according to claim 1, wherein the service policy comprises using the first beam to communicate with the network device when the terminal device transmits the PUCCH.

9. The method according to claim 1, wherein the service policy comprises using the first beam to communicate with the network device when the terminal device transmits the PHICH.

10. The method according to claim 1, wherein the service policy comprises using a second beam to communicate with the network device when the terminal device transmits the PDSCH.

11. The method according to claim 1, wherein the service policy comprises using a second beam to communicate with the network device when the terminal device transmits the PUSCH.

12. The apparatus according to claim 2, wherein the service policy further comprises:
  when the second beam is used for communicating with the network device, and when data transmitted by the terminal device to the network device is high-priority data, using a third transmission resource of the second beam to communicate with the network device.

13. The apparatus according to claim 12, wherein the service policy further comprises:
  when the second beam is used for communicating with the network device, and when data transmitted by the terminal device to the network device is low-priority data, using a fourth transmission resource of the second beam to communicate with the network device, wherein the third transmission resource is different from the fourth transmission resource.

14. The apparatus according to claim 2, wherein the service policy further comprises:
  when the first beam is determined to be used for communicating with the network device, and when data transmitted by the terminal device to the network device is low-priority data, determining to use a second transmission resource of the first beam to communicate with the network device, wherein the first transmission resource is different from the second transmission resource.

* * * * *